United States Patent
Zhang

(10) Patent No.: US 11,878,877 B2
(45) Date of Patent: Jan. 23, 2024

(54) MATERIAL CONVEYING DEVICE AND MATERIAL PROCESSING APPARATUS

(71) Applicant: XIAMEN HITHIUM ENERGY STORAGE TECHNOLOGY CO., LTD., Fujian (CN)

(72) Inventor: Qin Zhang, Fujian (CN)

(73) Assignee: XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 17/952,331

(22) Filed: Sep. 26, 2022

(65) Prior Publication Data
US 2023/0020606 A1    Jan. 19, 2023

Related U.S. Application Data

(63) Continuation of application No. PCT/CN2021/102854, filed on Jun. 28, 2021.

(30) Foreign Application Priority Data

Jun. 28, 2020 (CN) .......................... 202010602223.0
Jun. 28, 2020 (CN) .......................... 202021221824.9

(51) Int. Cl.
*B65G 47/88* (2006.01)
*B65G 13/02* (2006.01)

(52) U.S. Cl.
CPC ......... *B65G 47/8869* (2013.01); *B65G 13/02* (2013.01)

(58) Field of Classification Search
CPC . B65G 47/8869; B65G 13/02; B65G 47/8876
See application file for complete search history.

(56) References Cited

U.S. PATENT DOCUMENTS 1,900,149 A * 3/1933 Anderson .......... B65G 47/8869
                                              193/35 A
3,278,409 A * 10/1966 Barringer ............... C25D 17/08
                                              204/198

(Continued)

FOREIGN PATENT DOCUMENTS

CN    102115875 A    7/2011
CN    103228560 A    7/2013

(Continued)

OTHER PUBLICATIONS

Hiroki, WO2013146603 (Year: 2013).*

(Continued)

*Primary Examiner* — Gene O Crawford
*Assistant Examiner* — Lester Ill Rushin

(57) ABSTRACT

Provided are a material conveying device and a material processing apparatus. The material conveying device includes a frame and a plurality of conveying mechanisms sequentially arranged in a conveying direction of a material. An output end of each of the plurality of conveying mechanisms is connected to an input end of an adjacent conveying mechanism. Each of the plurality of conveying mechanisms includes a plurality of rollers each rotatably connected to the frame, and a driver in a transmission connection with one of the plurality of rollers to drive the one of the plurality of first rollers to rotate. Each conveying mechanism is driven by a separate driver. A speed of the material on different conveying mechanisms can be controlled by adjusting a direction and a magnitude of torque outputted by the driver.

18 Claims, 4 Drawing Sheets

(56) References Cited

U.S. PATENT DOCUMENTS

| | | | |
|---|---|---|---|
| 6,193,047 B1 * | 2/2001 | Brumm | B65G 13/02 |
| | | | 198/860.3 |
| 8,196,736 B2 | 6/2012 | Wagner | |
| 2008/0121498 A1 * | 5/2008 | Costanzo | B65G 17/24 |
| | | | 198/779 |
| 2013/0098294 A1 | 4/2013 | Rathweg | |
| 2020/0130938 A1 | 4/2020 | Pilarz et al. | |

FOREIGN PATENT DOCUMENTS

| | | | | |
|---|---|---|---|---|
| CN | 105098254 A | | 11/2015 | |
| CN | 212654945 U | | 3/2021 | |
| CN | 112722754 A | * | 4/2021 | B65G 41/008 |
| CN | 107814480 B | * | 1/2023 | C03B 35/163 |
| DE | 10300493 A1 | | 7/2004 | |
| DE | 102005049189 A1 | * | 4/2007 | B65G 47/29 |
| EP | 3792206 A1 | | 3/2021 | |
| JP | 4415296 B2 | * | 2/2010 | |
| MY | 158599 A | * | 10/2016 | C23C 14/0629 |

OTHER PUBLICATIONS

DE102005049189B4, Vorwerk (Year: 2007).*
International Search Report dated Sep. 1, 2021 in International Application No. PCT/CN2021/102854. English translation attached.

* cited by examiner

MATERIAL CONVEYING DEVICE AND MATERIAL PROCESSING APPARATUS

CROSS-REFERENCE TO RELATED APPLICATIONS

This application is a continuation of International Application No. PCT/CN2021/102854, filed on Jun. 28, 2021, which claims priority to Chinese Patent Application No. CN202010602223.0 filed on Jun. 28, 2020 and entitled "MATERIAL CONVEYING DEVICE AND MATERIAL PROCESSING APPARATUS", and to Chinese Patent Application No. CN202021221824.9 filed on Jun. 28, 2020 and entitled "MATERIAL CONVEYING DEVICE AND MATERIAL PROCESSING APPARATUS", the entire disclosures of which are incorporated herein by reference.

FIELD

The present disclosure relates to the field of mechanical apparatus, and more particularly, to a material conveying device and a material processing apparatus.

BACKGROUND

Assembly is one of the key aspects in production of a lithium battery. Generally, the assembly includes several processes such as cell hot-pressing, ultrasonic welding of tabs, flexible connection welding, shell insertion, and/or top cover welding. The present disclosure provides a material conveying device configured to convey a material.

SUMMARY

An object of embodiments of present disclosure includes, for example, providing a material conveying device and a material processing apparatus, which are intended to provide a new transmission method to control a conveying speed of a material.

According to an embodiment of the present disclosure, a material conveying device is provided. The material conveying device includes: a frame; and a plurality of conveying mechanisms sequentially arranged in a conveying direction of a material. An output end of each of the plurality of conveying mechanisms is connected to an input end of an adjacent conveying mechanism. Each of the plurality of conveying mechanisms includes a plurality of first rollers each rotatably connected to the frame, and a driver in a transmission connection with the one of the plurality of first rollers to drive the first roller to rotate.

According to the embodiment of the present disclosure, the plurality of conveying mechanisms is connected to the frame. The material is moved along the frame by a cooperation of the plurality of conveying mechanisms. Each of the plurality of conveying mechanisms is driven by, for example, a separate driver. The rollers are driven by the driver to rotate so as to move the material on the rollers. For example, a speed of the material on different conveying mechanisms can be controlled by adjusting a direction or a magnitude of a torque outputted by the driver to thus control a speed of the material at different positions of the frame. The material can be conveyed at a normal speed when processing apparatuses on a conveying line of the material conveying device are operated normally. When a certain processing apparatus fails, the material can be left temporarily on the frame without stopping an operation at an upstream end of the material conveying device.

According to an embodiment of the present disclosure, a material conveying device is provided. The material conveying device includes: a frame; and two or more conveying mechanisms consecutively arranged in a conveying direction of a material. Each of the two or more conveying mechanisms has an input end for receiving the material, and an output end for outputting the material. The input end of each of the two or more conveying mechanisms is connected to an output end of an immediately previous conveying mechanism adjacent to the conveying mechanism in the conveying direction. Each of the two or more conveying mechanisms includes a plurality of first rollers rotatably connected to the frame, and a driver in a transmission connection with the one of the plurality of first rollers to drive the first roller to rotate.

In some embodiments of the present disclosure, in a conveying mechanism, each of the plurality of first rollers is in a transmission connection with an adjacent first roller by a transmission belt, and the driver is in a transmission connection with the one of the plurality of first rollers located at an end of the conveying mechanism.

In some embodiments of the present disclosure, the driver in each conveying mechanism is independently controllable.

In some embodiments of the present disclosure, each of drivers of two adjacent conveying mechanisms is disposed at an input end of the corresponding conveying mechanism, and is in a transmission connection with the one of the plurality of first roller located at the input end of the corresponding one conveying mechanism.

In some embodiments of the present disclosure, in two adjacent conveying mechanisms including an upstream conveying mechanism and a downstream conveying mechanism in the conveying direction, the driver of the upstream conveying mechanism is arranged adjacent to an input end of the upstream conveying mechanism, and the driver of the downstream conveying mechanism is arranged adjacent to an output end of the downstream conveying mechanism. In the upstream conveying mechanism, the driver is in a transmission connection with the one of the plurality of first rollers close to the input end. In the downstream conveying mechanism, the driver is in a transmission connection with the one of the plurality of first rollers close to the output end.

In some embodiments of the present disclosure, in two adjacent conveying mechanisms including an upstream conveying mechanism and a downstream conveying mechanism in the conveying direction, the driver of the upstream conveying mechanism is arranged adjacent to an output end of the upstream conveying mechanism, and the driver of a downstream conveying mechanism is arranged adjacent to an output end of the downstream conveying mechanism. In each of the two adjacent conveying mechanisms, the driver is in a transmission connection with the one of the plurality of first rollers close to the output end.

In some embodiments of the present disclosure, the driver includes a motor and is capable of driving a roller located at an end of each of the plurality of conveying mechanisms to rotate in a forward direction or a reverse direction.

In some embodiments of the present disclosure, when the motor rotates in the forward direction, the roller rotates in the forward direction to allow the conveying mechanism to output a forward driving force to the material, and when the motor rotates in the forward direction, the roller rotates in the reverse direction to allow the conveying mechanism to output a reverse driving force to the material. Thus, a direction of a force exerted by the conveying mechanism on the material is adjusted to control a speed of the material.

In some embodiments of the present disclosure, the material conveying device also includes a guide assembly configured to guide the material during material conveying. The guide assembly is connected to the frame and located at two opposite ends of the plurality of first rollers.

In some embodiments of the present disclosure, the guide assembly includes a plurality of guide wheels arranged at intervals on the frame. The plurality of guide wheels is distributed at two ends of the plurality of first rollers corresponding to the plurality of guide wheels. A channel for the material to pass therethrough is defined by the plurality of guide wheels and the plurality of first rollers together.

In some embodiments of the present disclosure, the material conveying device also includes at least one first limiting member, and at least one first lifting assembly associated with the at least one first limiting member. The at least one first lifting assembly is connected to the at least one first limiting member, and is capable of driving the at least one first limiting member to be lifted or lowered, such that the at least one first limiting member is capable of being lifted through a gap between a pair of adjacent first rollers to prevent the material from being conveyed, or the at least one first limiting member is capable of being lowered through the gap between the pair of adjacent first rollers to allow the material to be conveyed.

In some embodiments of the present disclosure, the at least one first lifting assembly includes a connection base connected to the at least one first limiting member, and a motor capable of driving the at least one first limiting member to slide relative to the connection base.

In some embodiments of the present disclosure, the material conveying device also includes a material tray for carrying the material. During material conveying, the material tray is placed on the conveying mechanisms with two opposite ends of the material tray being in contact with a guide assembly located at two opposite ends of the plurality of first rollers to be guided by the guide assembly.

In some embodiments of the present disclosure, two opposite ends of the roller are connected to two adjacent first rollers by a transmission belt, respectively.

In some embodiments of the present disclosure, the frame is connected end to end to form an annular shape.

In some embodiments of the present disclosure, in two adjacent conveying mechanisms, at least one second roller is disposed between an input end of one of the two adjacent conveying mechanisms and an output end of the other one of the two adjacent conveying mechanisms. The at least one second roller is rotatably connected to the frame and in no transmission connection with the driver.

In some embodiments of the present disclosure, the material conveying device also includes at least one second limiting member, and at least one second lifting member associated with the at least one second limiting member. The at least one second lifting member is connected to the at least one second limiting member, and is capable of driving the at least one second limiting member to be lifted or lowered, such that the at least one second limiting member is capable of being lifted through a gap between a pair of adjacent second rollers to prevent the material from being conveyed, or the at least one second limiting member is capable of being lowered through the gap between the pair of adjacent second rollers to allow the material to be conveyed.

In some embodiments of the present disclosure, the present disclosure provides a material processing apparatus. The material processing apparatus includes a first processing device, a second processing device, and the material conveying device as described above. The first processing device and the second processing device are configured to cooperate with the material conveying device and spaced apart from each other in the conveying direction of the material.

In some embodiments of the present disclosure, the first processing device includes a cell hot-pressing device, and the second processing device includes a cell welder.

The material conveying device provided in the embodiments of the present disclosure can store the material temporarily. When a second processing device located downstream fails, the material can be stored on the material conveying device temporarily by adjusting a logistics speed of each conveying mechanism of the material conveying device, without shutting down the first processing device in such a process. Efficiency of the material processing apparatus can be improved and costs can be lowered.

BRIEF DESCRIPTION OF DRAWINGS

In order to clearly explain technical solutions of embodiments of the present disclosure, accompanying drawings used in the embodiments will be briefly described below. It should be understood that the following drawings illustrate only some embodiments of the present disclosure and therefore should not be construed as limiting the scope of the present disclosure. Based on these drawings, other drawings can be obtained by those of ordinary skill in the art without creative effort.

Figure 1:
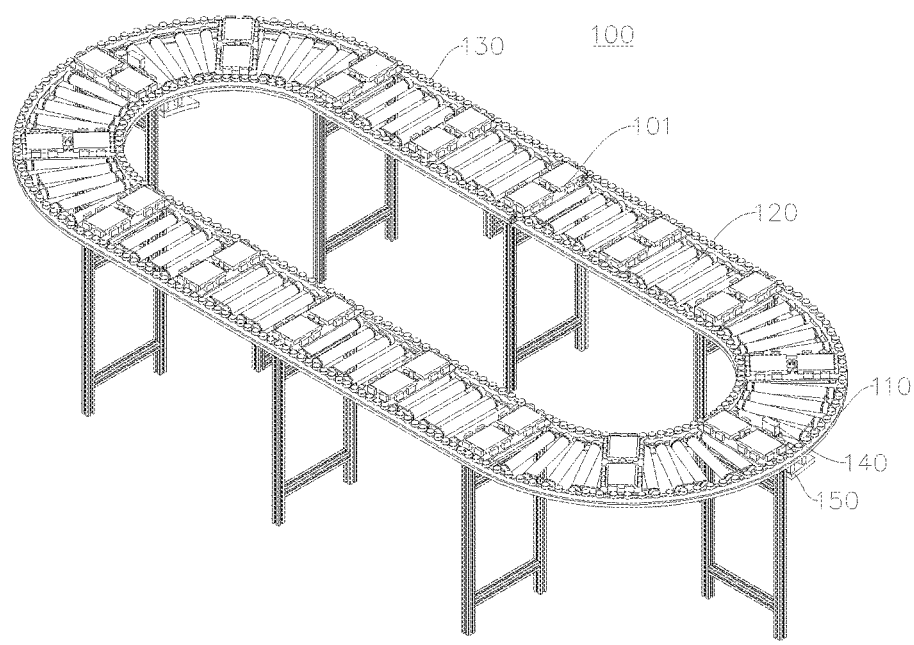
FIG. 1 illustrates a schematic structural view showing a material conveying device according to an embodiment of the present disclosure.

Reference Numerals: 100—material conveying device; 101—material tray; 110—frame; 120—conveying mechanism; 121—driver; 122—roller; 123—transmission belt; 130—guide assembly: 131—guide wheel; 140—limiting member; 150—lifting assembly; 200—material processing apparatus; 210—first processing device; 220—second processing device.

DESCRIPTION OF EMBODIMENTS

In order to make the objects, technical solutions, and advantages of the present disclosure more apparent, technical solutions according to embodiments of the present disclosure will be clearly and completely described below in combination with accompanying drawings of the embodiments of the present disclosure. Obviously, the embodiments described below are only a part of the embodiments of the present disclosure, rather than all of the embodiments.

Generally, assemblies according to the embodiments of the present disclosure described and illustrated in the accompanying drawings may be arranged and designed in different configurations.

Accordingly, the following detailed description of the embodiments of the present disclosure provided in the accompanying drawings is not intended to limit the protection scope of the present disclosure, but merely explains selected embodiments of the present disclosure. Based on the embodiments of the present disclosure, other embodiments obtained by those of ordinary skill in the art without creative labor shall fall within the scope of the present disclosure.

It should be noted that similar numerals and letters indicate similar items in the following accompanying drawings. Therefore, once an item is defined in one of the accompanying drawing, it is unnecessary to define and explain the item in subsequent drawings.

In the description of the embodiments of the present disclosure, it should be understood that, terms such as "center", "over", "below", "left", "right", "vertical", "horizontal", "inner", "outer", etc., is based on the orientation or position relationship shown in the drawings, or the orientation or position relationship in which a product provided by the present disclosure is customarily placed for use, or the orientation or position relationship as customarily understood by those skilled in the art, and is only for the convenience of describing the present disclosure and simplifying the description, rather than indicating or implying that the associated device or element must have a specific orientation, or be constructed and operated in a specific orientation, and therefore cannot be understood as a limitation on the present disclosure.

In addition, the terms "first", "second", "third", etc., are only used for distinguishing description, and cannot be understood as indicating or implying relative importance.

In the present disclosure, it should also be noted that, unless otherwise clearly specified and limited, terms such as "arranged", "disposed", "installed", "mounted", "connected" "coupled" and the like should be understood in a broad sense. For example, it may be a fixed connection or a detachable connection or connection as one piece; mechanical connection or electrical connection; direct connection or indirect connection through an intermediate; and internal communication between two components. For those of ordinary skill in the art, the specific meaning of the above-mentioned terms in the present disclosure can be understood according to specific circumstances.

Embodiments

FIG. 1 illustrates a schematic structural view showing a material conveying device 100 according to an embodiment of the present disclosure. Referring to FIG. 1, the material conveying device 100 according to the embodiment of the present disclosure is provided. In the embodiment of the present disclosure, the material conveying device 100 may be mainly configured to convey raw materials for a lithium battery and an intermediate product thereof. It should be understood that in other embodiments of the present disclosure, the material conveying device 100 may be configured to convey other materials, and the present disclosure does not limit the usage of the material conveying device 100.

The material conveying device 100 may include a frame 110, and a conveying mechanism 120. The conveying mechanism 120 may be connected to the frame 110. A material is movable on the frame 110 by the conveying mechanism 120.

In this embodiment, the frame 110 is substantially in an annular shape. The frame 110 may be connected end to end to form a closed loop, such that the material can be returned to an initial position after moving through one cycle on the frame 110 by the conveying mechanism 120. In this embodiment, the frame 110 is substantially in an oval shape, and has a flat upper surface to reduce energy consumption of the conveying mechanism 120. That is, the upper surface of the frame 110 may be parallel to a horizontal plane. In this manner, there is no displacement in a height direction during a movement of the material on the frame 110, which can reduce the energy consumption of the conveying mechanism 120.

It should be understood that in other embodiments of the present disclosure, the frame 110 may also be in other shapes, e.g., an elongated shape or a square shape. In embodiments where the frame 110 is in a shape other than the endless shape, the material is movable along the frame 110 from one end thereof to the other end thereof by the conveying mechanism 120. The upper surface of the frame 110 may also be a surface other than the flat surface, e.g., an inclined surface. For example, the upper surface of the frame 110 may have a height gradually decreasing in a conveying direction of the material, such that the material may have a tendency to move in the conveying direction of the material when placed on the upper surface of the frame 110. Therefore, the material can be conveyed at an increased conveying speed in a normal conveying process to reduce the energy consumption.

It should be noted that in the embodiments of the present disclosure, the "upper surface" of the frame 110 refers to a surface of the material conveying device 100 configured to carry the material, and is determined only with respect to an orientation in which the material conveying device 100 is usually placed for use, rather than indicating or implying that the frame 110 must have a specific upper surface.

In this embodiment, the frame 110 may be supported on the ground or an operating platform by a post. The frame 110 may be connected to a top end of the post. It should be understood that in other embodiments of the present disclosure, no post may be provided for the frame 110. Instead, the frame 110 may be mounted directly on a platform, or may be supported otherwise.

Figure 2:
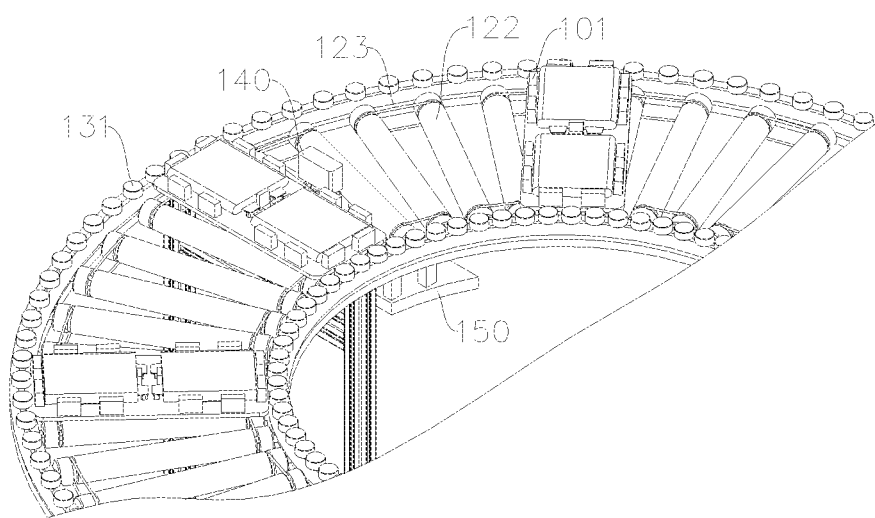
FIG. 2 illustrates a schematic partial view showing a material conveying device according to an embodiment of the present disclosure.

FIG. 2 illustrates a schematic partial view showing the material conveying device 100 according to an embodiment of the present disclosure. Reference may be made to FIG. 2 and FIG. 1. In this embodiment, the material conveying device 100 may include two conveying mechanisms 120 that may be arranged in the conveying direction of the material.

Figure 3:
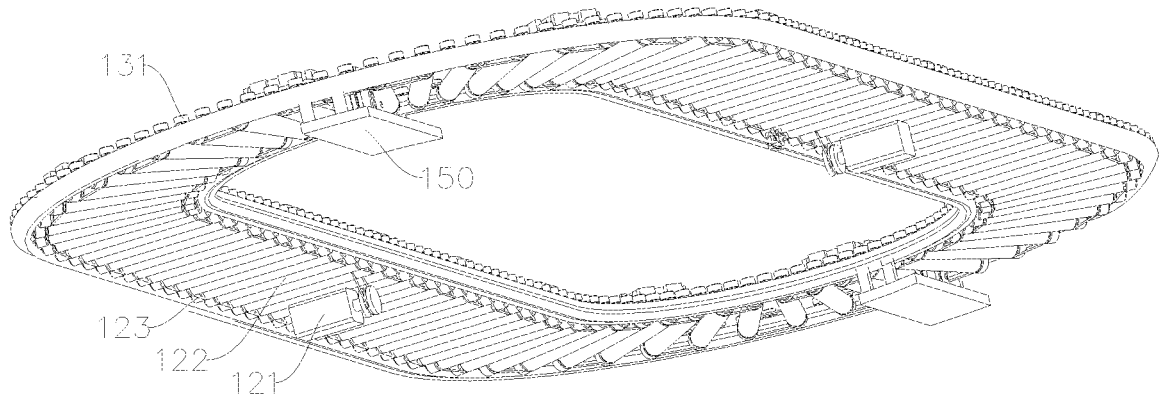
FIG. 3 illustrates a schematic partial view showing a conveying mechanism according to an embodiment of the present disclosure.

FIG. 3 illustrates a bottom view showing the material conveying device 100 according to an embodiment of the present disclosure. Reference may be made to FIG. 2 together with FIG. 3. In the present disclosure, the conveying mechanism 120 may include a driver 121, and a plurality of rollers 122 arranged at intervals. Each of the plurality of rollers 122 may be rotatably connected to the frame 110, such that the plurality of rollers 122 can rotate relative to the frame 110. The driver 121 may be mainly configured to drive the plurality of rollers 122 to rotate.

In this embodiment, each of the plurality of rollers 122 may be in a transmission connection with two adjacent rollers 122 by a transmission belt 123. That is, one roller 122 may be connected to two transmission belts 123, and the two transmission belts 123 may be connected to two adjacent rollers 122, respectively. In this manner, three adjacent rollers 122 may be linked in series by two transmission belts 123. For example, three rollers 122 are arranged at intervals in the conveying direction of the material, and includes a first roller 122, a second roller 122, and a third roller 122, respectively. The first roller 122 is rotatable relative to the frame 110, and may be in a transmission connection with the second roller 122 by the transmission belt 123 such that the second roller 122 can rotate. The second roller 122 may be in a transmission connection with the third roller 122 by the transmission belt 123, so that the third roller 122 can rotate.

The driver 121 may be in a transmission connection with one of the plurality of rollers 122 located at an end of the conveying mechanism 120. That is, the conveying mechanism 120 may include a plurality of rollers 122. The driver 121 may be connected to one of the plurality of rollers 122 located at the end of the conveying mechanism 120 to drive the one roller 122 to rotate relative to the frame 110. In the embodiments of the present disclosure, a first roller 122 in the conveying direction of the material may be in a transmission connection with the driver 121. That is, in the conveying direction of the material, the conveying mechanism 120 may have an upstream end and a downstream end. In this embodiment, the driver 121 may be in a transmission connection with one of the plurality of rollers 122 at the upstream end of the conveying mechanism 120. It should be understood that in other embodiments of the present disclosure, the driver 121 may be in a transmission connection with one of the plurality of rollers 122 at the downstream end of the conveying mechanism 120. Alternatively, different conveying mechanisms 120 may be arranged in different ways. For example, drivers 121 of some conveying mechanisms 120 may be each in a transmission connection with the roller 122 at the upstream end of a corresponding one of the some conveying mechanisms 120, and drivers 121 of some conveying mechanisms 120 may be each in a transmission connection with the roller 122 at the downstream end of a corresponding one of the some conveying mechanisms 120.

It should be noted that in other embodiments of the present disclosure, the driver 121 may drive, via another drive assembly, the roller 122 to rotate. For example, the driver 121 may be connected to the roller 122 by a chain or a gear.

In some embodiments of the present disclosure, the drivers 121 located in different conveying mechanisms 120 may be controlled separately. For example, all or part of a plurality of drivers 121 may be independently controllable.

In an embodiment of the present disclosure, the material conveying device 100 may include two conveying mechanisms 120. It should be understood that in other embodiments of the present disclosure, the material conveying device 100 may include three, four, or more conveying mechanisms 120. The present disclosure does not limit the number of the conveying mechanism 120. Accordingly, each conveying mechanism 120 may include two, three, four, or more rollers.

In the present disclosure, the material conveying device 100 includes a plurality of conveying mechanisms 120. Each of the plurality of conveying mechanisms 120 may be driven by one driver 121. As the material moves on the rollers 122, a speed at which the material moves on the frame 110 may be adjusted by controlling the plurality of drivers 121. Each driver 121 is capable of driving the rollers 122 to rotate. In some embodiments of the present disclosure, the speed at which the material moves on different conveying mechanisms 120 may be controlled through controlling rotation direction of the rollers 122 on different conveying mechanisms 120 by a direction of torque outputted by the driver 121.

For example, a first conveying mechanism 120 may accelerate a forward movement of the material, a second conveying mechanism 120 may output a backward driving force to apply a backward force to the material, thereby rapidly decelerating the material, and a third conveying mechanism 120 may output no driving force to stop the material on the rollers 122 located in the third conveying mechanism 120. Therefore, the material may be controlled to stop at a predetermined position or may be made to advance slowly. It should be understood that when the material needs to rapidly pass through the frame 110, each conveying mechanism 120 may output a forward driving force to accelerate a forward movement of the material through the frame 110.

For example, when a work station located on a conveying line of the material conveying device 100 fails during use, the material may be kept in a position of the work station by adjusting a magnitude or a direction of the torque outputted by the driver 121. An upstream conveying mechanism may continue conveying the material to the frame 110 until the frame 110 may no longer carry the material. This process does not affect a normal operation of an upstream work station, and thus the material conveying device 100 can have a function of temporarily storing a part of the material. In some embodiments of the present disclosure, for an embodiment where the frame 110 has an annular shape, when a work station located on the conveying line of the material conveying device 100 fails, the material moving on the annular frame 110 may be returned to a position corresponding to the work station.

In some embodiments of the present disclosure, in the present disclosure, the plurality of conveying mechanisms 120 in the material conveying device 100 may be arranged in many ways. The present disclosure provides an exemplary description of some implementations in this embodiment.

Figure 4:
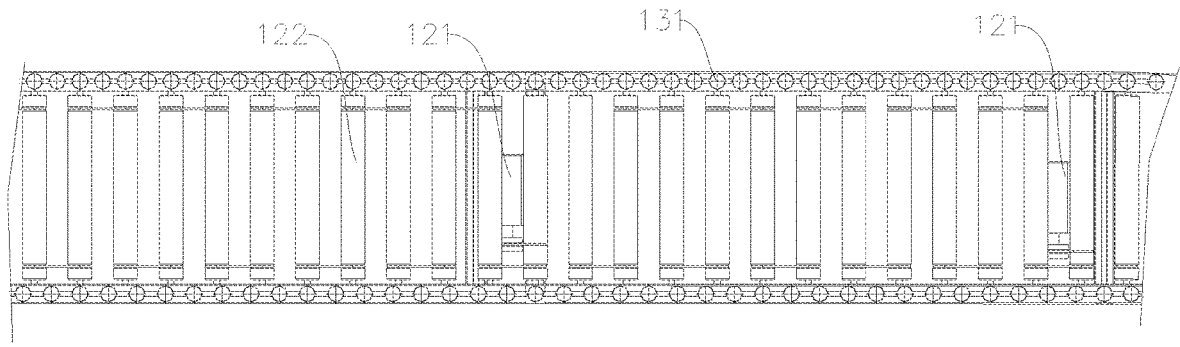
FIG. 4 illustrates a first implementation of two adjacent conveying mechanisms according to an embodiment of the present disclosure.

FIG. 4 illustrates an alternative implementation of two adjacent conveying mechanisms 120 according to an embodiment of the present disclosure.

In the implementation illustrated in FIG. 4, drive connection of the two conveying mechanisms 120 may be arranged in a same manner. For convenient description, in the conveying direction of the material (e.g., in a rightward-to-leftward direction in this drawing), the two conveying mechanisms 120 are referred to as a first conveying mechanism and a second conveying mechanism, respectively. An output end of the first conveying mechanism, i.e., an end, close to downstream, of two ends of the first conveying mechanism, may be connected to an input end of the second conveying mechanism, i.e., an end, close to upstream, of two ends of the second conveying mechanism. The drivers 121 of two adjacent conveying mechanisms 120 may each be in a transmission connection with the roller 122, close to the input end, of the conveying mechanism 120. That is, when the driver of each conveying mechanism 120 is arranged at the input end of the corresponding conveying mechanism 120, the drive connections of the two conveying mechanisms 120 may be arranged in the same manner.

Figure 5:
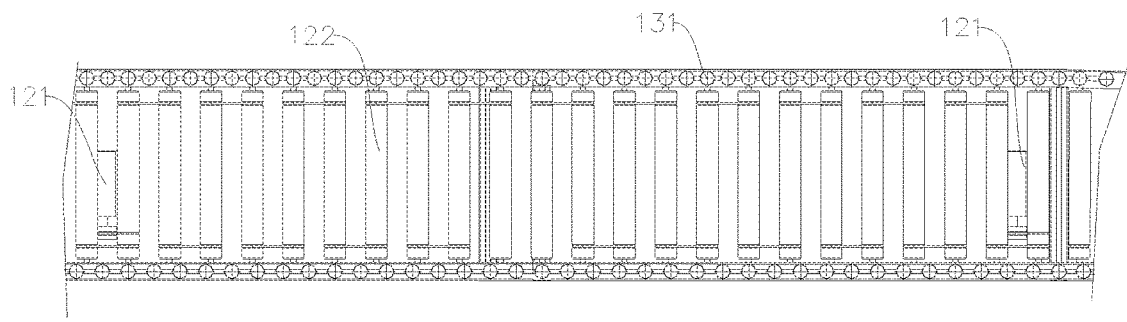
FIG. 5 illustrates a second implementation of two adjacent conveying mechanisms according to an embodiment of the present disclosure.

FIG. 5 illustrates an alternative implementation of two adjacent conveying mechanisms 120 according to an embodiment of the present disclosure.

In the implementation illustrated in FIG. 5, the drive connections of the two conveying mechanisms 120 may be arranged in different manners. In the conveying direction of the material (e.g., in a rightward-to-leftward direction in the drawing), an output end of an upstream conveying mechanism 120 of the two conveying mechanisms 120 may be connected to an input end of a downstream conveying mechanism 120 of the two conveying mechanisms 120. The driver 121 of the upstream conveying mechanism 120 may be in a transmission connection with the roller 122 close to the input end of this conveying mechanism 120, and the driver 121 of the downstream conveying mechanism 120 may be in a transmission connection with the roller 122 close to the output end of this conveying mechanism 120. That is, in the two adjacent conveying mechanisms, when the driver of the upstream conveying mechanism 120 is arranged adjacent to the input end (an end close to the upstream) of this conveying mechanism and the driver of the downstream conveying mechanism 120 is arranged adjacent to the output end (an end close to the downstream) of this conveying mechanism 120, the drive connections of the two adjacent conveying mechanisms 120 may be arranged in different manners.

Figure 6:
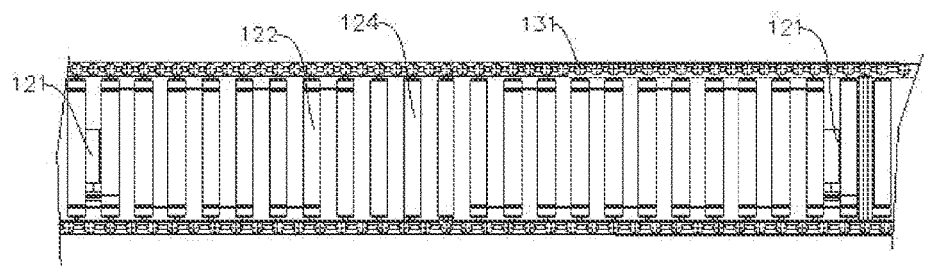
FIG. 6 illustrates a third implementation of two adjacent conveying mechanisms according to an embodiment of the present disclosure.

FIG. 6 illustrates an alternative implementation of two adjacent conveying mechanisms 120 according to an embodiment of the present disclosure.

In the implementation illustrated in FIG. 6, the two conveying mechanisms 120 are arranged in a similar manner to that in the implementation illustrated in FIG. 5. That is, in the conveying direction of the material (e.g., in a rightward-to-leftward direction in the drawing), when the driver of the upstream conveying mechanism 120 is arranged at the input end (an end close to the upstream) of this conveying mechanism 120 and the driver of the downstream conveying mechanism 120 is arranged at the output end (an end close to the downstream) of this conveying mechanism 120, the drive connections of the two adjacent conveying mechanisms 120 may be arranged in different manners.

The difference between the implementation illustrated in FIG. 5 and the implementation illustrated in FIG. 6 is that in the implementation illustrated in FIG. 6, a plurality of rollers 124 may be arranged between the output end of the upstream conveying mechanism 120 and the input end of the downstream conveying mechanism 120. In this case, for the purpose of distinction, in some embodiments of the present disclosure, each of the above-mentioned roller 122 may be referred to as a first roller, and each roller 124 mentioned here may be referred as a second roller. Each of the plurality of rollers 124, i.e., each of the plurality of second rollers, located between the two conveying mechanisms 120 may be in no direct or indirect transmission connection with the driver 121, for example, is not directly connected to the driver 121, or is not connected to the driver 121 by the transmission belt. That is, no power source exits among the plurality of rollers 124 located between the two conveying mechanisms 120. The plurality of rollers 124 located between the two conveying mechanisms 120 may not be rotated by the driver 121.

The conveying mechanism 120 is capable of driving the material to move at a predetermined moving speed. When the material moves to the plurality of rollers 124 located between the two conveying mechanisms 120, the material may continue moving to a next conveying mechanism 120 due to inertia. The plurality of rollers 124 located between the two conveying mechanisms 120 can avoid kinetic energy of the material from being lost greatly.

It should be understood that a number of the rollers 124 located between the two conveying mechanisms 120 may be determined based on the kinetic energy outputted by the conveying mechanisms 120, a weight of the material, or the like. For example, one, two, three, or more rollers 124 may be provided.

In other embodiments of the present disclosure, numbers, inter-roller distances, diameters, or the like of the rollers of the plurality of conveying mechanisms 120 may be the same or not exactly the same.

In this embodiment, the driver 121 may include a motor that may be in a transmission connection with the roller 122 by a belt. It should be understood that in other embodiments, the motor may be directly connected to the roller 122, or may be connected to the roller 122 by a speed reducer.

The driver 121 may include the motor. When the motor rotates forwardly, the roller 122 may rotate in a forward direction to allow the conveying mechanism 120 to output a forward driving force to the material; and when the motor rotates reversely, the roller 122 may rotate in a reverse direction to allow the conveying mechanism 120 to output a reverse driving force to the material.

It should be understood that in other embodiments of the present disclosure, the driver 121 may be of other structures. Accordingly, in some embodiments, the driver 121, instead of driving the roller 122 to rotate in the reverse direction and the forward direction, may only output torque of different magnitudes.

Referring again to FIG. 2, in this embodiment, the material conveying device 100 may also include a guide assembly 130 connected to the frame 110. The guide assembly 130 may be disposed at two opposite ends of the roller 122 or the roller 124. That is, the guide assembly 130 may be arranged at two opposite ends of the roller 122 and/or the roller 124 and connected to the frame 110.

In this embodiment, the guide assembly 130 may include a plurality of guide wheels 131 arranged at intervals on the frame 110. The plurality of guide wheels 131 may be distributed at two opposite ends of the rollers 122 and/or the rollers 124, and may be rotatably connected to the frame 110. A curved surface of each of the plurality of guide wheels 131 may be perpendicular to an axis of the roller 122 and/or the roller 124.

The guide wheels 131 may be rotatably connected to the frame 110. The material may be brought into contact with the plurality of guide wheels 131 during the movement on the frame 110. An interaction between the material and the plurality of guide wheels 131 may rotate the guide wheels 131, such that the material can move in a direction tangential to the curved surface of each of the plurality of guide wheels 131. Therefore, a friction between the material and the plurality of guide wheels 131 can be reduced to lower an energy loss and energy consumption.

It should be understood that in other embodiments of the present disclosure, the guide assembly 130 may also of other structures. For example, the guide assembly 130 may be a guide plate extending in a predetermined direction. The predetermined direction is a target moving direction of the material. Or, the guide assembly 130 may be a fence connected to the frame 110 to prevent the material from moving out of the frame 110. Or, in an embodiment where the frame 110 extends in a straight line, no guide assembly 130 may be provided.

Referring again to FIG. 2, in this embodiment, the material conveying device 100 may also include a limiting member 140 and a lifting assembly 150. The lifting assembly 150 is connected to the limiting member 140 to drive the limiting member 140 to be lifted or lowered, such that the limiting member 140 is capable of being lifted or lowered through a gap between two adjacent rollers 122 and/or two adjacent rollers 124.

The lifting assembly 150 may be connected to the limiting member 140 to drive the limiting member 140 to be lifted, so that the limiting member 140 passes between two rollers 122 and/or 124 and extends to an upper end of each of the two rollers 122 and/or 124. When the limiting member 140 extends to the upper end of each of the two rollers 122 and/or 124, the material may stop at this position by the limiting member 140. In some embodiments of the present disclosure, the lifting assembly 150 can control the lowering of the limiting member 140 without obstructing a further movement of the material. For example, when the conveying mechanism 120 conveys the material to the predetermined position, the lifting assembly 150 controls the lifting of the limiting member 140, so that the material can stop at the predetermined position. After the material is processed accordingly, the lifting assembly 150 controls the lowering of the limiting member 140 without obstructing the further movement of the material.

Exemplarily, the lifting assembly 150 may include the motor and a connection base. The limiting member 140 may be slidingly connected to the connection base. The limiting member 140 is driven by the motor to slide relative to the connection base, so as to achieve sliding. It should be understood that in other embodiments of the present disclosure, the lifting assembly 150 may of other structures.

It should be noted that in other embodiments of the present disclosure, depending on specific processing needs for the material, the lifting assembly 150 and the limiting member 140 are configured or not configured, or the lifting assembly 150 and the limiting member 140 may not be disposed.

Referring again to FIG. 1, in an embodiment of the present disclosure, the material conveying device 100 also includes a material tray 101. Two opposite ends of the material tray 101 may be engaged with the guide assemblies 130 located at two opposite ends of the roller 122 and/or 124, respectively. That is, in the present disclosure, the material tray 101 may match with the guide assemblies 130, such that each of the two opposite ends of the material tray 101 may be tangential to the respective guide wheel 131 located at both ends of the roller 122 and/or 124. The material tray 101 may move orderly by the guide wheel 131. For example, in this embodiment, the material tray 101 may be configured to contain a lithium battery. It should be understood that in other embodiments of the present disclosure, the material tray 101 may be configured to contain other materials. In other embodiments of the present disclosure, the material conveying device 100 may have no material tray 101. For example, no material tray 101 is provided for a material that does not need to be stored into a container. Or, in other embodiments, the material tray 101 may be obtained separately through, e.g., market purchases.

The material conveying device 100 according to the embodiments of the present disclosure can at least provide the following advantages.

The plurality of conveying mechanisms 120 may be connected to the frame 110. The material may be moved along the frame 110 by a cooperation of the plurality of conveying mechanisms 120. Each of the plurality of conveying mechanisms 120 can be driven by a separate driver 121. The driver 121 can drive the roller 122 to rotate to move the material on the roller. The speed of the material on different conveying mechanisms 12 can be controlled by adjusting the direction or the magnitude of the torque outputted by the driver 121 to thus control the speed of the material at different positions of the frame 110. The material can be conveyed at a normal speed when the processing apparatus on the conveying line of the material conveying device 100 is operated normally. When a certain processing apparatus fails, the material will be left temporarily on the frame 110 without stopping an operation at the upstream end of the material conveying device 100.

Figure 7:
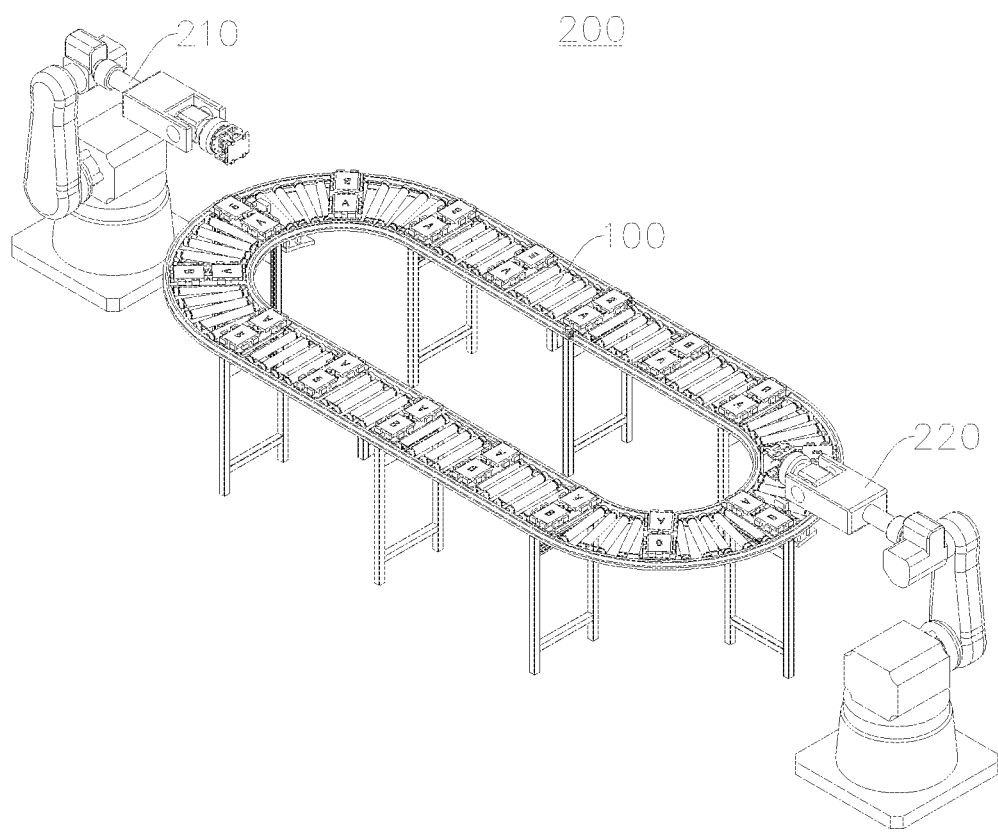
FIG. 7 illustrates a schematic structural view showing a material processing apparatus according to an embodiment of the present disclosure.

FIG. 7 illustrates a schematic structural view showing a material processing apparatus 200 according to an embodiment of the present disclosure. Referring to FIG. 7, this embodiment may also provide a material processing apparatus 200. The material processing apparatus 200 may include a first processing device 210, a second processing device 220, and the material conveying device 100 described above.

The first processing device 210 and the second processing device 220 are configured to cooperate with the material conveying device 100, and spaced apart from each other in the conveying direction of the material.

In the conveying direction of the material, the first processing device 210 is located upstream, and the second processing device 220 is located downstream.

As mentioned above, the material conveying device 100 according to the embodiments of the present disclosure can store the material temporarily. When the second processing device 220 located downstream fails, the material can be stored on the material conveying device 100 temporarily by adjusting a logistics speed of each conveying mechanism 120 of the material conveying device 100, without shutting down the first processing device 210 in such a process. Efficiency of the material processing apparatus 200 can be improved and costs can be lowered.

Exemplarily, the first processing device 210 may include a cell hot-pressing device. The present disclosure does not limit a specific structure of the cell hot-pressing device. For example, an existing cell hot-pressing device may be employed. The second processing device 220 may include a cell welder. Accordingly, an existing cell welder may be employed.

In the present disclosure, when the cell hot-pressing device is damaged, a cell stored on the material conveying device 100 may be provided as a cell for the cell welder without suspending an operation of the cell welder. When the cell welder fails, a cell provided by the cell core hot-pressing may be stored on the material conveying device 100 without suspending an operation of the cell hot-pressing device.

While preferred embodiments of the present disclosure have been described above, the present disclosure is not limited thereto. For those skilled in the art, various changes and modifications can be made to the present disclosure. Any modification, equivalent replacement, improvement, etc., made within the spirit and principle of the present disclosure shall fall within the scope of the present disclosure.

INDUSTRIAL APPLICABILITY

Embodiments of the present disclosure provide a material conveying device. In the material conveying device, a plurality of conveying mechanisms may be connected to a frame. A material can be moved along the frame by the plurality of conveying mechanisms. Each of the plurality of conveying mechanisms can be driven by a separate driver. The driver is capable of driving a roller to rotate to move the material on the roller. A speed of the material on different conveying mechanisms can be controlled by adjusting a direction or a magnitude of a torque outputted by the driver to thus control a speed of the material at different positions of the frame. The material can be conveyed at a normal speed when the processing apparatus on a conveying line of the material conveying device are operated normally. When a certain processing apparatus fails, the material can be left temporarily on the frame without stopping an operation at an upstream end of the material conveying device. In addition, the embodiments may also provide a material processing apparatus. The material processing apparatus may include a first processing device, a second processing device, and the material conveying device as described above. When the second processing device located downstream fails, the material can be stored on the material conveying device temporarily by adjusting a logistics speed of each conveying mechanism of the material conveying device, without shutting down the first processing device in such a process. Efficiency of the material processing apparatus can be improved, and costs can be lowered.

What is claimed is:

1. A material conveying device, comprising:
   a frame;
   a plurality of conveying mechanisms sequentially arranged in a conveying direction of a material, an output end of each of the plurality of conveying mechanisms being connected to an input end of an adjacent conveying mechanism,
   wherein each of the plurality of conveying mechanisms comprises:
      a plurality of first rollers each rotatably connected to the frame; and
      a driver in a transmission connection with one of the plurality of first rollers to drive the one of the plurality of first rollers to rotate; and
   at least one first limiting member, and at least one first lifting assembly associated with the at least one first limiting member,
      wherein the at least one first lifting assembly is connected to the at least one first limiting member, and is capable of driving the at least one first limiting member to be lifted or lowered, such that the at least one first limiting member is capable of being lifted through a gap between a pair of adjacent first rollers to prevent the material from being conveyed, or the at least one first limiting member is capable of being lowered through the gap between the pair of two adjacent first rollers to allow the material to be conveyed,
   wherein the material conveying device further comprises a guide assembly configured to guide the material during material conveying, the guide assembly being connected to the frame and located at two opposite ends of the plurality of first rollers, wherein:
      the guide assembly comprises a plurality of guide wheels arranged at intervals on the frame, the plurality of guide wheels being distributed at two ends of the plurality of first rollers corresponding to the plurality of guide wheels and rotatably connected to the frame; and
      a channel for the material to pass therethrough is defined by the plurality of guide wheels, the frame, and the plurality of first rollers together.

2. The material conveying device according to claim 1, wherein in a conveying mechanism, each of the plurality of first rollers is in a transmission connection with an adjacent first roller by a transmission belt, and the driver is in a transmission connection with the one of the plurality of first rollers located at an end of the conveying mechanism.

3. The material conveying device according to claim 1, wherein the driver located in each conveying mechanism is independently controllable.

4. The material conveying device according to claim 1, wherein each of drivers of two adjacent conveying mechanisms is disposed at an input end of the corresponding conveying mechanism, and is in a transmission connection with the one of the plurality of first rollers located at the input end of the corresponding conveying mechanism.

5. The material conveying device according to claim 1, wherein:
   in two adjacent conveying mechanisms comprising an upstream conveying mechanism and a downstream conveying mechanism along the conveying direction, the driver of the upstream conveying mechanism is arranged adjacent to an input end of the upstream conveying mechanism, and the driver of the downstream conveying mechanism is arranged adjacent to an output end of the downstream conveying mechanism;
   in the upstream conveying mechanism, the driver is in a transmission connection with the one of the plurality of first rollers close to the input end; and
   in the downstream conveying mechanism, the driver is in a transmission connection with the one of the plurality of first rollers close to the output end.

6. The material conveying device according to claim 1, wherein:
   in two adjacent conveying mechanisms comprising an upstream conveying mechanism and a downstream conveying mechanism in the conveying direction, the driver of the upstream conveying mechanism is arranged adjacent to an output end of the upstream conveying mechanism, and the driver of the downstream conveying mechanism is arranged adjacent to an output end of the downstream conveying mechanism; and
   in each of the two adjacent conveying mechanisms, the driver is in a transmission connection with the one of the plurality of first rollers close to the output end.

7. The material conveying device according to claim 1, wherein the at least one first lifting assembly comprises:
   a connection base connected to the at least one first limiting member; and
   a motor capable of driving the at least one first limiting member to slide relative to the connection base.

8. The material conveying device according to claim 1, further comprising a material tray for carrying the material, wherein during material conveying, the material tray is placed on the conveying mechanisms with two opposite ends of the material tray being in contact with a guide assembly located at two opposite ends of the plurality of first rollers to be guided by the guide assembly.

9. The material conveying device according to claim 1, wherein the frame is connected end to end to form an annular shape.

10. The material conveying device according to claim 1, wherein in two adjacent conveying mechanisms, at least one second roller is disposed between an input end of one of the two adjacent conveying mechanisms and an output end of the other one of the two adjacent conveying mechanisms, the at least one second roller being rotatably connected to the frame and in no transmission connection with the driver.

11. The material conveying device according to claim 10, further comprising at least one second limiting member, and at least one second lifting member associated with the at least one second limiting member,
   wherein the at least one second lifting member is connected to the at least one second limiting member, and is capable of driving the at least one second limiting member to be lifted or lowered, such that the at least one second limiting member is capable of being lifted through a gap between a pair of adjacent second rollers to prevent the material from being conveyed, or the at least one second limiting member is capable of being lowered through the gap between the pair of adjacent second rollers to allow the material to be conveyed.

12. A material conveying device, comprising:
a frame;
two or more conveying mechanisms consecutively arranged in a conveying direction of a material, each of the two or more conveying mechanisms having an input end for receiving the material and an output end for outputting the material, the input end of each of the two or more conveying mechanisms being connected to the output end of an immediately previous conveying mechanism adjacent to the conveying mechanism in the conveying direction,
wherein each of the two or more conveying mechanisms comprises:
   a plurality of first rollers rotatably connected to the frame; and
   a driver in a transmission connection with one of the plurality of first rollers to drive the one of the plurality of first rollers to rotate; and
at least one first limiting member, and at least one first lifting assembly associated with the at least one first limiting member,
   wherein the at least one first lifting assembly is connected to the at least one first limiting member, and is capable of driving the at least one first limiting member to be lifted or lowered, such that the at least one first limiting member is capable of being lifted through a gap between a pair of adjacent first rollers to prevent the material from being conveyed, or the at least one first limiting member is capable of being lowered through the gap between the pair of two adjacent first rollers to allow the material to be conveyed,
wherein the material conveying device further comprises a guide assembly configured to guide the material during material conveying, the guide assembly being connected to the frame and located at two opposite ends of the plurality of first rollers, wherein:
   the guide assembly comprises a plurality of guide wheels arranged at intervals on the frame, the plurality of guide wheels being distributed at two ends of the plurality of first rollers corresponding to the plurality of guide wheels and rotatably connected to the frame; and
   a channel for the material to pass therethrough is defined by the plurality of guide wheels, the frame, and the plurality of first rollers together.

13. The material conveying device according to claim 12, wherein in a conveying mechanism, each of the plurality of first rollers is in a transmission connection with an adjacent first roller by a transmission belt, and the driver is in a transmission connection with the one of the plurality of first rollers located at an end of the conveying mechanism.

14. The material conveying device according to claim 12, wherein the driver located in each conveying mechanism is independently controllable.

15. A material processing apparatus, comprising:
a first processing apparatus;
a second processing apparatus; and
the material conveying apparatus according to claim 1,
   wherein the first processing apparatus and the second processing apparatus are configured to cooperate with the material conveying apparatus and spaced apart from each other in the conveying direction of the material.

16. The material processing apparatus according to claim 15, wherein:
the first processing apparatus comprises a cell hot-pressing device; and
the second processing apparatus comprises a cell welder.

17. A material processing apparatus, comprising:
a first processing apparatus;
a second processing apparatus; and
the material conveying apparatus according to claim 12,
   wherein the first processing apparatus and the second processing apparatus are configured to cooperate with the material conveying apparatus and spaced apart from each other in the conveying direction of the material.

18. The material processing apparatus according to claim 17, wherein:
the first processing apparatus comprises a cell hot-pressing device; and
the second processing apparatus comprises a cell welder.

* * * * *